United States Patent [19]

Blauer et al.

[11] Patent Number: 5,593,754
[45] Date of Patent: Jan. 14, 1997

[54] BREATHABLE FABRIC CONSTRUCTION FOR OUTERWEAR

[75] Inventors: Stephen J. Blauer; Charles Blauer, both of Lexington, Mass.; Mark A. Mordecai, Hampton, N.H.

[73] Assignee: Blauer Manufacturing Company, Inc., Boston, Mass.

[21] Appl. No.: 551,998

[22] Filed: Nov. 2, 1995

Related U.S. Application Data

[63] Continuation-in-part of Ser. No. 222,524, Apr. 4, 1994, Pat. No. 5,466,515.
[51] Int. Cl.[6] ............................................. B32B 3/10
[52] U.S. Cl. .................. 428/131; 428/102; 428/135; 428/137; 428/193; 428/246; 428/252; 428/253; 428/304.4; 428/421; 428/422; 428/423.1
[58] Field of Search ........................ 428/131, 137, 428/138, 246, 252, 253, 304.4, 421, 422, 423.1, 135, 102, 193

[56] References Cited

U.S. PATENT DOCUMENTS

| | | | |
|---|---|---|---|
| 3,438,829 | 4/1969 | Coe | 156/235 |
| 3,651,520 | 3/1972 | Jacob | 2/272 |
| 3,703,730 | 11/1972 | Miller | 2/272 |
| 3,794,548 | 2/1974 | Wirth et al. | 161/89 |
| 3,804,700 | 4/1974 | Hoey | 161/160 |
| 4,148,958 | 4/1979 | Tischer et al. | 428/196 |
| 4,159,360 | 6/1979 | Kim | 428/195 |
| 4,173,199 | 11/1979 | Fassina | 118/212 |
| 4,304,812 | 12/1981 | Perkins | 428/247 |
| 4,380,604 | 4/1983 | Neuhaus et al. | 524/873 |
| 4,435,442 | 3/1984 | Hafele | 427/14.1 |
| 4,443,511 | 4/1984 | Worden et al. | 428/198 |
| 4,868,928 | 9/1989 | Norvell | 2/272 |

FOREIGN PATENT DOCUMENTS 1201941   6/1967   United Kingdom .

OTHER PUBLICATIONS

*Enka and Pellon Teaming Up With Weatherproof Garment Lining,* Nonwovens Industry 34, May, 1988.
*Choosing Waterproof Wear,* Adapted from articles by Ellen Reagan in Outside Business Magazine, Apr. 1990 and Apr. 1992.
David J. Bucheck, Comfort Improvement Using Waterproof Breathable Fabrics, (Date unknown).
"The Facts About Sympatex®"Akzo Fibers & Polymers Division, Enka America, Inc. (9 pages).
Specification Sheet, Technical Information of W. L. Gore & Associates (2 pages).
Specification Sheet, Information of W. L. Gore & Associates (12 pages).
Krishnan, "Hydrophilic Urethanes for Textiles", 23 Journal of Coated Fabrics 54 (Jul. 1993).

*Primary Examiner*—James J. Bell
*Attorney, Agent, or Firm*—Morse, Altman & Benson

[57] ABSTRACT

A fabric structure comprising a shell and a lining in close proximity to each other. The shell includes an outer woven synthetic fabric, a relatively high-tensile-strength stratum printed on the inner face thereof and covering from 10 to 90% of the surface of the inner face, and fluorocarbon impregnation thereof. The lining includes an inner synthetic polymer or cotton-blend fabric, an optional synthetic polymer water-vapor-permeable membrane, and an optional outer synthetic polymer fabric. Preferably, the shell and lining are secured together by stitching at the edges and seams.

48 Claims, 3 Drawing Sheets

BREATHABLE FABRIC CONSTRUCTION FOR OUTERWEAR

RELATED APPLICATION

This application is a continuation-in-part of application Ser. No. 08/222,524 entitled WEATHER PROTECTIVE FABRIC COMBINATION, OUTERWEAR CONSTRUCTED THEREFROM, filed on Apr. 4, 1994, now U.S. Pat. No. 5,466,515 in the names of Stephen J. Blauer and Charles Blauer.

FIELD OF THE INVENTION

The present invention relates to fabric constructions for outerwear, and, more particularly, to fabric constructions for coats, pants, jackets, boots, gloves, and other outer clothing that are designed for protection against inclement weather.

THE PRIOR ART

Clothing for inclement weather typically is constructed from fabrics or combinations of fabrics that strive to achieve seemingly inconsistent objectives. It is desired that such clothing be vapor permeable, water repellent, wind obstructing, stain resistant, dimensionally stable, externally durable, and internally comfortable. Vapor permeable membranes and/or tight weaving have been among the compromises needed to permit simultaneous vapor permeability, water repulsion, and wind obstruction. Special fabrics and/or coatings have been among the compromises needed for stain resistance, dimensional stability, external durability, and internal comfort. In particular, for example, the interstices within tightly woven fabric, which must remain open to achieve breathing, tend to become blocked by water proofing and wind blocking treatments.

Dimensional stability was typically achieved by a applying a continuous coating of material that covered substantially the entire inner surface of the outer fabric. A continuous coating has several shortcomings. Typically, the coating was applied by spreading it onto the fabric, which allowed air pockets to develop between the coating and the fabric. These air pockets had to be removed by hand using a flat edge, such as the edge of a yardstick, a procedure that is very inefficient and adds significant costs to the production of the fabric.

A second weakness is the lack of breathability of a continuous coating, which made these coated fabrics uncomfortable to wear. Because the coating covered the entire area of the fabric, there were no openings to allow the air to pass through the interstices of the fabric. To overcome this weakness, thin coatings and/or coatings made of a softer and weaker material were tried. However, these coatings had another problem in that they had a tendency to wash off during laundering. And the thicker coatings had a tendency to stiffen in colder weather, making them uncomfortable to wear.

Another weakness of the continuous coating is related to the lack of breathability. When the coated fabrics are cut to shape in the production process, a vacuum table is used to hold the fabric stable. If the fabric has a low breathability, only a small number of layers can be cut simultaneously because the vacuum generated by the table can reach through only several layers of coated fabric. If the coated fabric is more breathable, more layers of fabric can be held and cut simultaneously, making the production process more time and cost efficient.

Thus, there is an ongoing need for the improvement of outerwear, especially in the way that dimensional stability is provided, for protection against inclement weather.

BRIEF DESCRIPTION OF THE INVENTION

The present invention relates to outerwear comprising an outer shell and an inner lining that combine to achieve vapor permeability, water repellency, wind obstruction, stain resistance, dimensional stability, external durability, and internal comfort. More specifically, the present invention relates to a fabric construction comprising an outer shell and an inner lining that are characterized by particular materials and interrelationships.

The shell is composed of a woven, synthetic fabric which initially is impregnated with a protective material and printed on its inner face with a stratum composed of a high-tensile-strength material, and after which the protective coating is cured. The printed stratum covers from 10 to 90% of the surface area of the inner face of the fabric and may be in a variety of patterns.

The lining is composed of either (1) a soft synthetic fabric, (2) a soft synthetic fabric supporting a waterproof, breathable membrane, or (3) a waterproof, breathable membrane sandwiched between a pair of soft synthetic fabric supports. The membrane is either a separate film that is laminated to the fabric or a coating that is either formed on or adhered to the fabric. The membrane has a structure that is characterized by either microscopic pores or hydrophilic molecular chains which are infinitesimally smaller in dimension than the interstices in the synthetic fabric of the shell.

Preferably, the shell and lining are attached together by stitching at the edges and other seams using heavy-duty texturized thread.

External durability and stain resistance are provided by the woven synthetic fabric of the shell. Dimensional stability is provided by the printed stratum. Water repellency and wind obstruction are provided to some degree by the woven synthetic fabric of the shell and to a major degree by the membrane of the lining. Vapor transmission is enabled by the membrane of the lining and permitted by the interstices in the synthetic fabric of the lining, the interstices in the synthetic fabric of the shell, and the openings in the pattern of the printed stratum. Comfortable contact with the wearer is provided by the synthetic fabric of the lining.

Accordingly, the invention comprises the fabric structures, outerwear, and processes which are described in the following specification, the scope of which will be indicated in the appended claims.

BRIEF DESCRIPTION OF THE DRAWINGS

For a fuller understanding of the nature and objects of the present invention, reference is made to the accompanying drawings wherein.

DETAILED DESCRIPTION OF THE PREFERRED EMBODIMENT

Figure 1:
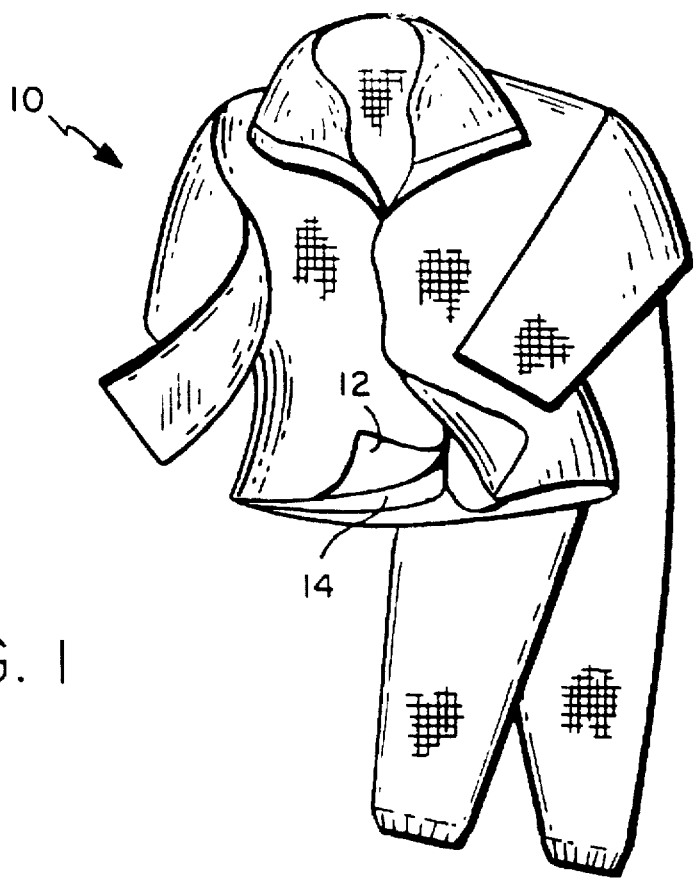
FIG. 1 is a perspective view of a storm coat and storm pants embodying the present invention.

FIG. 1 illustrates an outdoor outfit 10 consisting of a jacket and pants that embody the present invention. All of the major areas, i.e. bodice, arms, and legs, comprise an outer shell 12 and an inner lining 14. FIGS. 2 to 10 illustrate details of the shell 12 and the lining 14.

The shell 12 and lining 14 are attached together by stitching at the edges, such as at the cuff and hem, and other seams of the garment, such as where the arm meets the shoulder. As a result, the shell 12 and lining 14 are secured in close proximity to each other, but are not adhesively attached to each other over a majority of their areas. Preferably, the stitching is done with a wrapped core thread, where the core is a polyester and the wrap is a texturized polyester. The wrapped core construction gives the thread added strength.

The Shell of FIGS. 2 and 5 to 10

Figure 2:
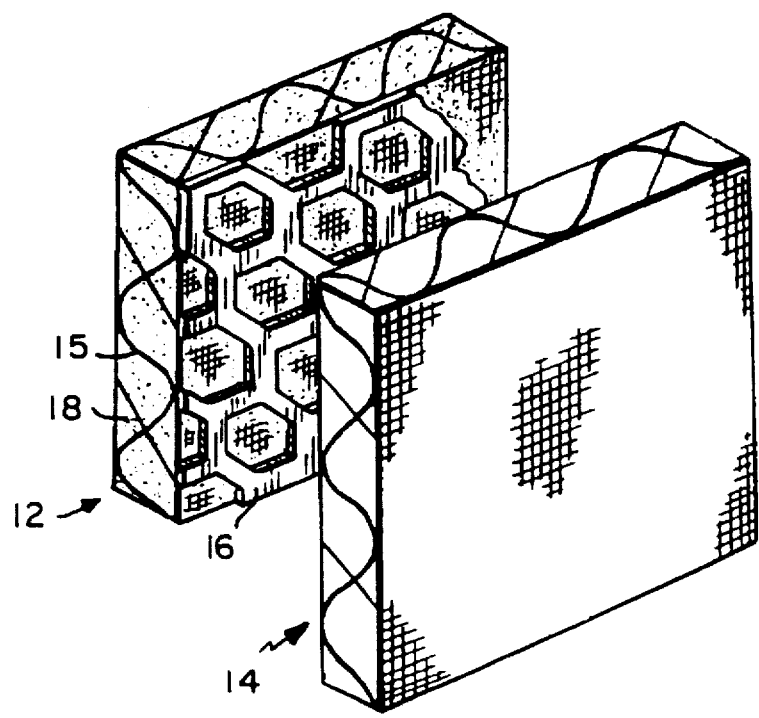
FIG. 2 is a grossly exaggerated view of one embodiment of the fabric construction of the clothing of FIG. 1, cross-sectioned to illustrate fabric, impregnation, and molecular structure.

As shown in FIG. 2, the shell 12 generally comprises a woven, synthetic polymer fabric 15 that is characterized generally by a low level of water absorption, for example, nylon, acrylic, or polyester. After the fabric 15 is scoured and dyed, it is impregnated with a finishing composition 18, preferably a fluorocarbon release agent that will not clog the interstices of the fabric. The finishing composition 18 is not cured until later in the fabric contruction process.

After the impregnation, a printed stratum 16 of a relatively high-tensile-strength, highly flexible elastomer, such as an acrylic urethane, is applied directly to the inner face of the fabric 15. The printed stratum 16 provides the shell 12 with dimensional stability and prevents the fabric 15 from unraveling. Preferably, the pattern of the printed stratum 16 is characterized by solid portions that cover between 10 and 90% of the fabric 15 and weighs from 0.1 to 1 ounces per square yard.

Figure 5:
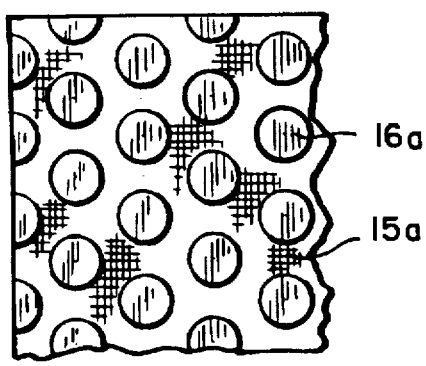
FIG. 5 illustrates one unconnected pattern that may be imprinted on the inner face of the shell.
Figure 6:
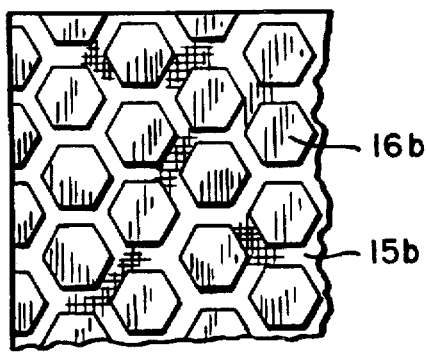
FIG. 6 illustrates a second unconnected pattern that may be imprinted on the inner face of the shell.
Figure 7:
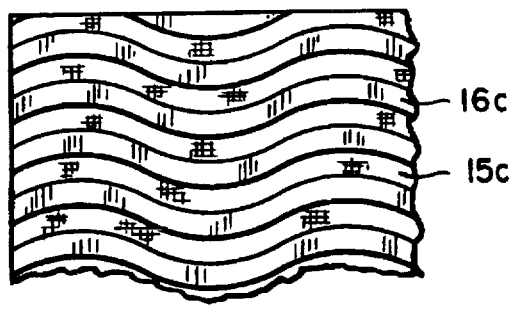
FIG. 7 illustrates a third unconnected pattern that may be imprinted on the inner face of the shell.

It has been discovered that a multiplicity of patterns, both unconnected and connected are satisfactory, provided that the coverage is from 10 to 90% of the fabric 15. Unconnected patterns are characterized by separate and discrete portions of elastomer. There are unconnected patterns that are unconnected in only one dimension, such as a set of wavy lines that extend from one edge of the fabric to another, and unconnected patterns that are unconnected in two dimensions, such as a set of dots. Examples of unconnected patterns are shown in FIGS. 5 to 7, and include dots 16a, hexagons 16b, and wavy lines 16c.

Figure 8:
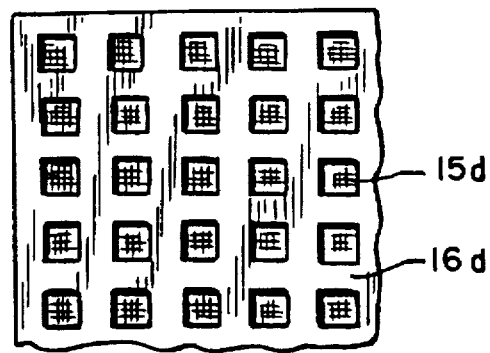
FIG. 8 illustrates one connected pattern that may be imprinted on the inner face of the shell.
Figure 9:
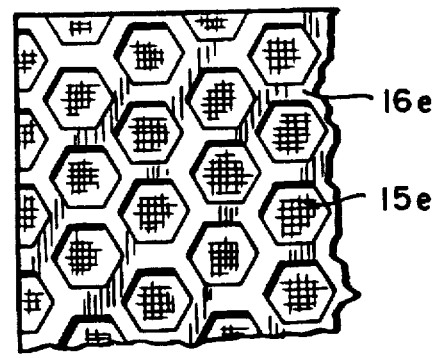
FIG. 9 illustrates a second connected pattern that may be imprinted on the inner face of the shell.
Figure 10:
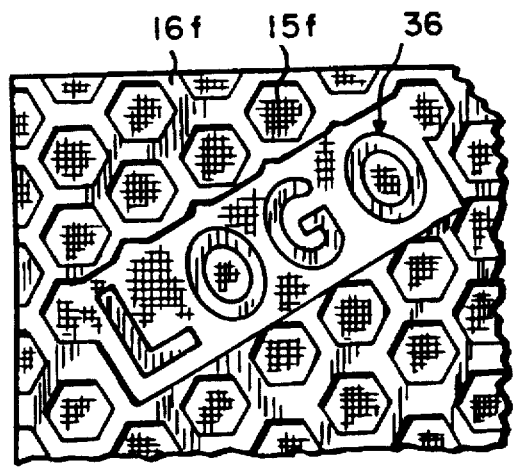
FIG. 10 illustrates a connected pattern with interruptions for a logo that may be imprinted on the inner face of the shell.

Connected patterns are patterns in which the elastomer is a mesh; that is, the elastomer is a continuous layer with openings that expose the inner face of the fabric 15. Examples of connected patterns are shown in FIGS. 8 and 9, and include contiguous, hollow, regular shapes with common sides, shapes such as squares 16d or hexagons 16e. It may be noted that, even within connected patterns, there may be discontinuities 36 in the pattern 16f where, for example, a company logo might be placed, as shown in FIG. 10.

The printed stratum covering from 10 to 90% of the fabric has several advantages over the prior art. Previously, a softer and weaker urethane coating had to be used if the shell was to be breathable because the coating covered the entire surface of the fabric. The problem with the softer and weaker urethane is that it readily washed off in laundering. A harder and stronger urethane resulted in a shell that was too stiff to be truly comfortable, and that became even stiffer as the weather became colder. By introducing breaks or discontinuities in the material of the printed stratum, a harder and stronger urethane can be used. It is more durable, does not wash off in laundering, and does not make the shell too stiff for comfort.

In the typical production process of making outerwear, fabric is cut by an automatic cutter and a vacuum table. The vacuum table holds the fabric for cutting. With the previous coatings that covered the entire surface of the fabric, only a small number of layers could be held down and cut simultaneously because of the low porosity of the completely-coated fabric. With the printed stratum of the present invention, many more layers of fabric can be held down and cut simultaneously because the openings in the printed stratum result in a much more porous fabric so the vacuum suction can penetrate more layers. The effect of this is to save time and money in the manufacturing process.

Following application of the printed stratum 16, the finishing composition 18 is cured. The finishing composition 18 gives the shell a protective, water repellent treatment. It has been found that the durability of the printed stratum 16 and its adhesion to the fabric 15 is optimum when impregnation of the finishing composition 18 occurs before the printed stratum 16 is applied and curing takes place after the printed stratum 16 is applied.

Figure 3:
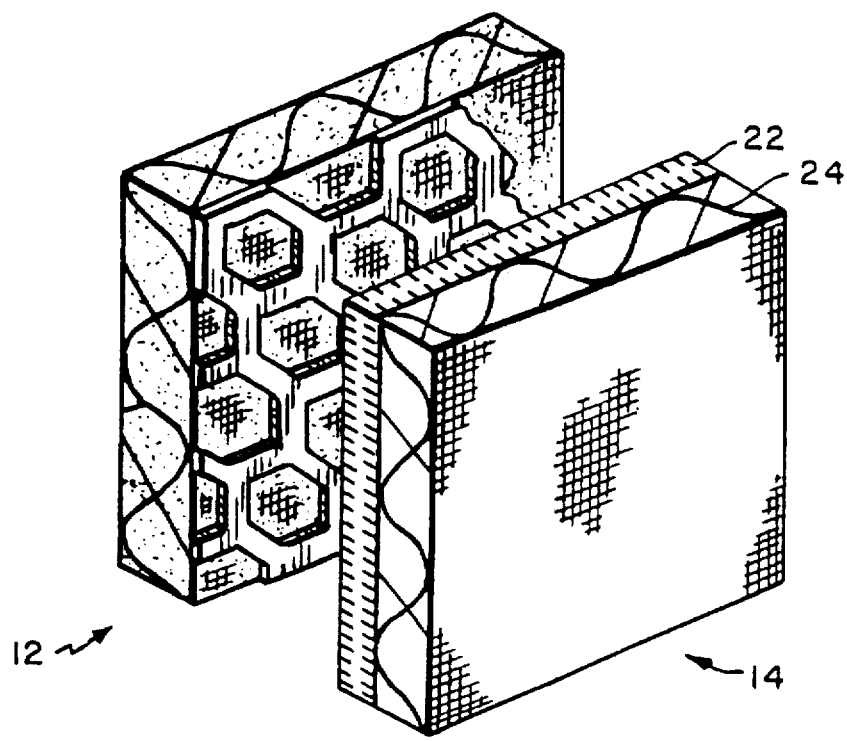
FIG. 3 is a grossly exaggerated cross-sectional view of another embodiment of the fabric construction of the clothing of FIG. 1.
Figure 4:
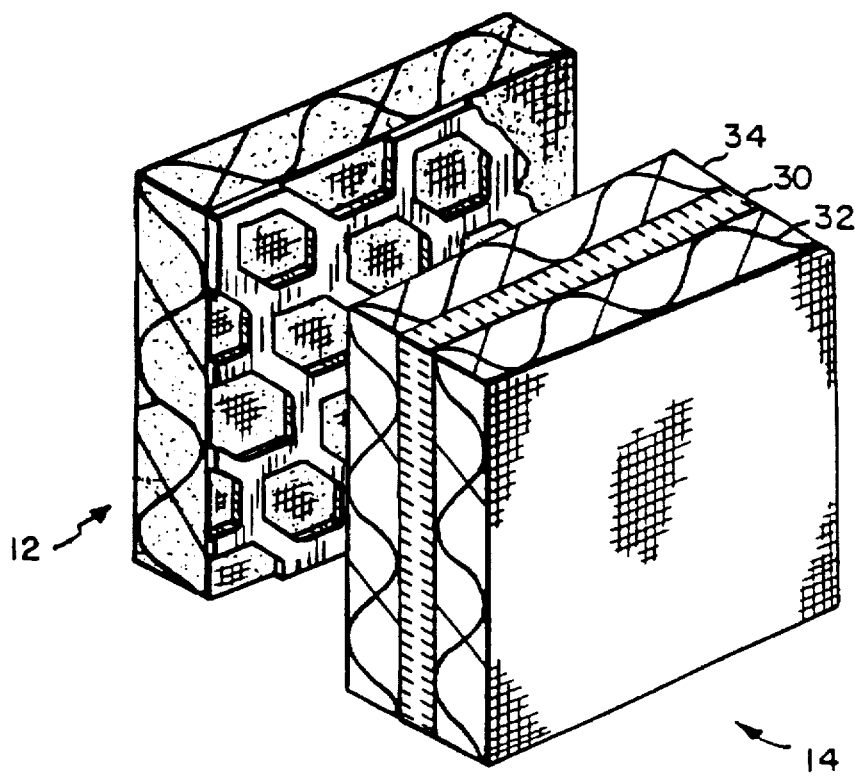
FIG. 4 is a grossly exaggerated cross-sectional view of yet another embodiment of the fabric construction of the clothing of FIG. 1.

The Lining of FIGS. 2 to 4

The lining 14 of the present invention has three preferred embodiments based on the number of layers, three preferred embodiments based on the composition of the membrane stratum, and two preferred embodiments based on how the membrane stratum is attached to the fabric stratum.

In one layer embodiment of the present invention, shown in FIG. 2, the lining 14 comprises a single fabric stratum. Preferably, the fabric 20 is a woven nylon, polyester, or a cotton blend that presents a soft, comfortable surface for contact with and drape about a wearer.

In another layer embodiment, shown in FIG. 3, the lining 14 comprises a membrane stratum 22 at its outer face and a fabric stratum 24 at its inner face. The membrane stratum 22 is composed of a thin polymer which, by virtue of its physico-chemical structure, i.e. its microstructure or molecular structure, is capable of transmitting water vapor and of blocking liquid water. The fabric stratum 24 is a knitted or woven synthetic, such as polyester or nylon, that presents a soft, comfortable surface for contact with and drape about a wearer.

In a further layer embodiment of the lining 14, shown in FIG. 4, a membrane stratum 30 is sandwiched between an outer fabric stratum 34 and an inner fabric stratum 32. The membrane stratum 30 is composed of a thin polymer which is capable of transmitting water vapor and of blocking liquid water. The inner fabric stratum 32 is a knitted or woven synthetic polymer fabric that presents a soft, comfortable surface for contact with and drape about a wearer and the outer fabric stratum 34 is a knitted synthetic fabric, such as polyester or nylon.

In one membrane composition embodiment, the membrane stratum 22, 30 is composed of an expanded microporous polymer, i.e. a polymer which has been stretched to produce therethrough microscopic pores (micropores) that are sufficiently large to permit the transmission of water vapor, but that are too small to permit the passage of droplets of liquid water. Droplets of liquid water have a sufficiently large surface tension to preclude deformation necessary for passage through the micropores.

In another membrane composition embodiment, the membrane stratum 22, 30 is a hydrophilic urethane polymer or a hydrophilic copolyester polymer. In these materials, water vapor travels along molecular chains through the thermal gradient established between a relatively high temperature at the surface of a wearer and a relatively low temperature remote from the surface of the wearer.

In a further membrane composition embodiment, the membrane stratum 22, 30 is a combination of a microporous material and a hydrophilic material, thereby taking some of the characteristics of both materials.

In one membrane attachment embodiment, the membrane stratum 22, 30 is a separate film that is laminated to the fabric stratum 24, 32, 34. In another membrane attachment embodiment, the membrane stratum 22, 30 is a coating that is formed on or adhered to the fabric stratum 24, 32, 34. There are several methods for forming the coating, direct and cast. Direct coating consists of depositing the membrane material directly onto the fabric stratum 24, 32 and then smoothing the material to a layer that is approximately 1 mm thick. Cast coating entails depositing a uniformly thick layer of the membrane material on a release paper, adhering the exposed surface of the material to the fabric stratum 24, 32, and removing the release paper.

Examples of Preferred Components

The following examples are preferred materials of the different components of the fabric construction of the present invention:

EXAMPLE I

The Shell Fabric 15

Cloth Type:
200 Denier nylon (warp), and 3-ply 70 denier taslanized nylon (filling), plain weave
Count:
warp: 114, filling: 52
Weight (uncoated):
5.5 ounces per square yard (±0.4 ounces)
Break Strength (pounds):
warp: 351 (minimum), filling: 156 (minimum)
Tear Strength (lbs.):
warp: 19 (minimum), filling: 8 (minimum)
Shrinkage:
warp: 2% (maximum), filling: 2% (maximum)
Color Fastness and Crocking:
Good

EXAMPLE II

The Shell Fabric 15

Cloth Type:
70 denier nylon (warp), and 2-ply 70 denier taslanized nylon (filling), plain weave
Count:
warp: 158, filling: 68
Weight: (uncoated):
3.0 ounces per square yard (±0.4 ounces)
Break Strength (pounds):
warp: 210 (minimum), filling: 100 (minimum)
Tear Strength (pounds):
warp: 4 (minimum), filling: 6 (minimum)
Shrinkage:
warp: 2% (maximum), filling: 2% (maximum)
Color Fastness and Crocking:
Good 20/40 hours

EXAMPLE III

The Protective Material 18

After the shell fabric 15 is scoured and dyed, it is given a protective, water repellant treatment which consists of the fabric 15 being impregnated with a protective material. After the printed stratum 16 has been applied and dried, the protective material is cured in a manner which is well understood by those skilled in the art. One such protective material is a fluorocarbon solution sold by 3M under the trade designation SCOTCHGARD®. It has been found that durability of the printed stratum 16 and its adhesion to fabric 15 is optimum when impregnation occurs before the printed stratum 16 is applied and the curing occurs after the printed stratum 16 is dried.

EXAMPLE IV

The Printed Stratum 16

A printed, non-ravel, honeycomb-pattern coating to ensure breathability, prevent seam slippage and fabric unraveling, and maintain shell fabric appearance. The coating consists of an aqueous blend of acrylic, urethane and silicone. The resulting stratum consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. In the present case, the screen is designed to print a hexagonal pattern, where the hexagonal shapes are hollow and contiguous with common sides. The pattern has about a 50% coverage and 9 cells per linear inch. Preferred coating weight add-on is in the range of 0.3 to 0.5 ounces per square yard. A formulation of this type is sold by Lyons Coatings, Inc., Franklin, Mass., under the trade designation Coating Compound 975-3.

EXAMPLE V

The Printed Stratum 16

A printed, non-ravel, wavy line-pattern coating to ensure breathability, prevent seam slippage and fabric unraveling, and maintain shell fabric appearance. The coating consists of an aqueous blend of acrylic, urethane and silicone. The resulting stratum consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. In the present case, the screen is designed to print a wavy-line pattern, such that the lines are continous from one edge of the fabric 15 to the opposite edge. The lines are approximately sinusoidal in shape and are about ⅛-inch wide and about ⅛-inch apart. The pattern has about a 50% coverage. Preferred coating weight add-on is in the range of 0.3 to 0.5 ounces per square yard. A formulation of this type is sold by Lyons Coatings, Inc., Franklin, Mass., under the trade designation Coating Compound 975-3.

EXAMPLE VI

The Printed Stratum 16

A printed, non-ravel, dot-pattern coating to ensure breathability, prevent seam slippage and fabric unraveling, and maintain shell fabric appearance. The coating consists of an aqueous blend of acrylic, urethane and silicone. The resulting pattern consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. In the present case, the screen is designed to print a circular dot pattern with about 50% coverage and 9 dots per linear inch with each dot being about ⅛-inch in diameter. Preferred coating weight add-on is in the range of 0.3 to 0.5 ounces per square yard. A formulation of this type is sold by Lyons Coatings, Inc., Franklin, Mass., under the trade designation Coating Compound 975-3.

EXAMPLE VII

The Lining Fabric 20, 24, 32, 34

The lining fabric 20, 24, 32, 34 has the following specifications:

Cloth Type:
100% nylon, plain weave, 70 denier warp and filling
Count:
warp: 104, filling: 86
Weight:
1.8 ounces per square yard

EXAMPLE VIII

The Lining Fabric 20, 24, 32, 34

The lining fabric 20, 24, 32, 34 has the following specifications:

Cloth Type:
100% nylon weave or knit, 40 denier, single-ply
Count:
Wales: 39, Courses: 40

EXAMPLE IX

The Lining Fabric 20, 24, 32, 34

The lining fabric 20, 24, 32, 34 has the following specifications:

Cloth Type:
100% texturized polyester, 70 denier warp and filling
Count:
warp: 102, filling: 102
Weight:
2.18 ounces per square yard

EXAMPLE X

The Vapor Permeable Membrane 22, 30

The membrane 22, 30 is a porous composite film that is laminated to the lining fabric 24, 32, 34. The film 22, 30 is made from two components. One component is pure expanded polytetrafluoroethylene. This portion of the film 22, 30 contains about nine billion pores per square inch. The pores are much smaller than a droplet of liquid water but much larger than a molecule of water vapor. Liquid water cannot pass through the film 22, 30, but moisture vapor can pass through. The other component is polyalkylene oxide polyurethane-urea, an oleophobic substance that prevents contamination of the film 22, 30 from oils, cosmetics, insect repellents, food substances, and other hazards. Porous films of this type are sold under the trade designation GORE-TEX® by W. L. Gore & Associates, Inc., Elkton, Md. This film has the following specifications:

Weight (ounces per square yard):
0.75±0.25
Breathability (MVTR grams per square meter per 24 hours):
650 minimum, ASTM E-96-80 Procedure B
Hydrostatic Resistance (pounds per square inch):
60 minimum, Federal Standard 191, Method 5512 (Mullen Tester)

EXAMPLE XI

The Vapor Permeable Membrane 22, 30

The membrane 22, 30 is a microporous coating. The coating is either directly applied to the lining fabric 24, 32 or is applied to a release paper, adhered to the lining fabric 24, 32, and the release paper removed. The micropores in the coating are much smaller than a droplet of liquid water but much larger than a molecule of water vapor. Liquid water cannot pass through the membrane 22, 30 but moisture vapor can pass through. Porous coatings of this type are sold under the trade designation ULTREX® II by Burlington Industries of Burlington, N.Y. This coating has the following specifications:

Raw Material:
Polyurethane
Spray Rating:
100, AATCC-22-85
Suter Hydrostatic (millimeters):
greater than 1275, AATCC-127-85
Rain Test (grams):
0.02, AATCC-35-85, 3 feet for 5 minutes
Impact Penetration (grams):
0.01, AATCC-42-80
Breathability (MVTR grams per square meter per 24 hours):
250–600, ASTM E-96-80, 74° F. @49% relative humidity

EXAMPLE XII

The Vapor Permeable Membrane 22, 30

The membrane 22, 30 is a non-porous, hydrophilic polyester ether film that is laminated to the lining fabric 24, 32, 34. The film has molecular chains that have a water vapor conductive or capillary effect. Water vapor enters into the closed membrane and moves along the molecular chains.

The direction of movement is determined by the water vapor concentration gradient between the front and back of the membrane. In the vicinity of a textile, water vapor is mixed with air. As the air temperature rises, it can absorb increasing concentrations of water vapor. For example, the warm air between skin and clothing can absorb up to approximately 40 μg/m$^3$ of water vapor and outside air at 20° C. up can absorb up to approximately 17 μg/m$^3$. Even in rainy weather, the water vapor concentration is higher on the side closest to the skin than on the outside. This results in transport of water vapor from inside to outside. Non-porous hydrophilic polyesters of this type are sold under the trade designation SYMPATEX® by Ekzo of Arnheim, Netherlands. This film has the following specifications:

Raw material: hydrophilic polyester ether

Structure: homogeneous, non-porous

Density: 1.27 grams per cubic meter

Thickness: 15 micrograms

Width: 155 centimeters

Visual properties: colorless, transparent, slightly opaque

Softening point: above 200° C.

Melting point: above 220° C.

Shrinkage in hot air: slight shrinkage (<1%) up to 200° C.

Strength: more than 1.5 daN/5 cm

Stretch before tearing: approximately 300%

Permanent stretch: approximately 20% after 50% overall stretch

Recovery: up to approximately 4% overall stretching no residual stretching

Moisture absorption: 1.6% at 50% relative humidity, 20° C.

Windproofness: no air passage (DIN 53887)

Water absorption: approximately 5% at 20° C. after wetting and spin drying

Water vapor permeability: above 2500 grams per square meter per 24 hours ASTM E 96-66 (method B, modified)

Water tightness: no water permeation at 1 bar=10 meter water column (DIN 53886)

EXAMPLE XIII

The Vapor Permeable Membrane 22, 30

The membrane 22, 30 is a non-porous, hydrophilic polyurethane coating. The coating is either directly applied to the lining fabric 24, 32, 34 or is applied to a release paper, adhered to the lining fabric 24, 32, 34, and the release paper removed. The coating has molecular chains that have a water vapor conductive or capillary effect. Water vapor enters into the coating and moves along the molecular chains. The direction of movement is determined by the water vapor concentration gradient between the front and back of the coating. In the vicinity of a textile, water vapor is mixed with air. As the air temperature rises, it can absorb increasing concentrations of water vapor. For example, the warm air between skin and clothing can absorb up to approximately 40 μg/m$^3$ of water vapor, and outside air at 20° C. can absorb up to approximately 17 μg/m$^3$. Even in rainy weather, the water vapor concentration is higher on the side closest to the skin than on the outside. This results in transport of water vapor from inside to outside. Non-porous hydrophilic polyurethanes of this type are sold under the trade designation TRAVTECH® by Travis Textiles, Inc., New York, N.Y. This coating has the following specifications:

Raw material:

hydrophilic polyurethane that is the reaction product of an organic polyisocyanate, poly(alkalenether)glycol, poly(oxyethylene)glycol, and a reactive hydroxyl group-containing poly(dimethyl siloxane) with a functionality of two or more Water vapor permeability (grams per square meter per 24 hours):

500–600, ASTM E 96

Hydrostatic Resistance (pounds per square inch):

100, 50 after 5 launderings, Method 5512 (Mullen Tester)

Spray Rating:

90–100, 50–70 after 5 launderings, Method AATCC-22

Examples of Preferred Combinations

The following examples are preferred combinations of the above-described components of the present invention:

EXAMPLE XIV

Preferred Combination A

A preferred combination of shell and lining comprises the following:

Shell fabric 15:

nylon as specified in Example I

Protective material 18:

fluorocarbon as specified in Example III

Printed stratum 16:

connected hexagonal pattern as specified in Example IV

Lining fabric 20:

Nylon weave as specified in Example VII

EXAMPLE XV

Preferred Combination B

A preferred combination of shell and lining comprises the following:

Shell fabric 15:

nylon as specified in Example I

Protective material 18:

fluorocarbon as specified in Example III

Printed stratum 16:

connected hexagonal pattern as specified in Example IV

Lining fabric 24:

Polyester weave as specified in Example IX

Membrane 22:

polytetrafluorethylene, polyalkylene oxide polyurethane urea composite film as specified in Example IX

EXAMPLE XVI

Preferred Combination C

Another preferred combination of shell and lining comprises the following:

Shell fabric 15:

nylon as specified in Example I

Protective material 18:

fluorocarbon as specified in Example III

Printed stratum 16:

connected hexagonal pattern as specified in Example IV

Outer lining fabric 34:

nylon knit as specified in Example VIII

Membrane 30:

polytetrafluorethylene, polyalkylene oxide polyurethane urea composite film as specified in Example X Inner lining fabric 32:

polyester weave as specified in Example IX

EXAMPLE XVII

Preferred Combination D

Another preferred combination of shell and lining comprises the following:

Shell fabric 15:

nylon as specified in Example II

Protective material 18:

fluorocarbon as specified in Example III

Printed stratum 16:

unconnected wavy-line pattern as specified in Example V

Lining fabric 24:

Nylon knit or weave as specified in Example VIII

Membrane 22:

microporous polyurethane coating as specified in Example XI

EXAMPLE XVIII

Preferred Combination E

Another preferred combination of shell and lining comprises the following:

Shell fabric 15:

nylon as specified in Example I

Protective material 18:

fluorocarbon as specified in Example III

Printed stratum 16:

unconnected dot pattern as specified in Example VI

Protective impregnation 18:

fluorocarbon as specified in Example VI

Lining fabric 24:

Nylon knit or weave as specified in Example VIII

Membrane 22:

hydrophilic polyester ether film as specified in Example XII

EXAMPLE XIX

Preferred Combination F

Another preferred combination of shell and lining comprises the following:

Shell fabric 15:

nylon as specified in Example I

Protective material 18:

fluorocarbon as specified in Example III

Printed stratum 16:

unconnected dot pattern as specified in Example VI

Protective impregnation 18:

fluorocarbon as specified in Example VI

Outer lining fabric 34:

polyester knit as specified in Example IX

Membrane 30:

hydrophilic polyurethane coating as specified in Example XIII

Inner lining fabric 32:

Nylon weave as specified in Example VIII

OPERATION

The shell 12 and lining 14 cooperate in the following manner: Vapor permeability is enabled by a hydrophilic or microporous membrane 22, 30 in cooperation with the openings in the printed stratum 16 and the interstices of the shell fabric 15 and the lining fabric 24, 32, 34. Water repellency is achieved by the treated shell fabric 15, and by the membrane 22, 30 which protects against seepage through the lining fabric 24, 34. Wind obstruction is achieved by the shell fabric 15 and the membrane 22, 30. Stain resistance and durability are achieved by the shell fabric 15 and the treatment to which it has been subjected 18. The lining fabric 20, 24, 34 has a pleasant hand and feel. The construction ensures a comfortable balance among evaporation, conduction, and convection in the space between the shell 12 and the lining 14.

What is claimed is:

1. A fabric structure comprising:

(a) a shell and a lining secured in close proximity to each other and spaced from each other over a majority of the areas of said shell and said lining;

(b) said shell including an outer woven synthetic fabric, a stratum printed on the inner face thereof, and release agent impregnation thereof;

(c) said stratum having a pattern characterized by 10 to 90% coverage of the area of said outer shell fabric; and (d) said stratum being composed of a high tensile strength material that is adhesively bonded to said shell outer fabric, adhesively free of said lining, and adapted to prevent said shell outer fabric from unraveling and to maintain the shape of said shell.

2. The fabric structure of claim 1 wherein said stratum is composed of a urethane polymer.

3. The fabric structure of claim 1 wherein said stratum is characterized substantially by a mesh.

4. The fabric structure of claim 1 wherein said stratum is characterized substantially by a mesh with interruptions for at least one representation.

5. The fabric structure of claim 1 wherein said stratum is characterized by a plurality of discrete portions.

6. The fabric structure of claim 1 wherein said stratum is characterized by a plurality of discrete portions in a repeating configuration with interruptions for at least one representation.

7. The fabric structure of claim 1 wherein said lining is selected from the class consisting of nylon, polyester, and a cotton blend.

8. A fabric structure comprising:

(a) a shell and a lining secured in close proximity to each other and spaced from each other over a majority of the areas of said shell and said lining;

(b) said shell including an outer woven synthetic fabric, a stratum printed on the inner face thereof, and release agent impregnation thereof;

(c) said lining including an intermediate synthetic polymer water-vapor-permeable membrane and an inner synthetic polymer fabric;

(d) said stratum having a pattern characterized by 10 to 90% coverage of the area of said outer shell fabric; and (e) said stratum being composed of a high tensile strength material that is adhesively bonded to said shell outer fabric, adhesively free of said lining, and adapted to prevent said shell outer fabric from unraveling and to maintain the shape of said shell.

9. The fabric structure of claim 8 wherein said stratum is composed of a urethane polymer.

10. The fabric structure of claim 8 wherein said stratum is characterized substantially by a mesh.

11. The fabric structure of claim 8 wherein said stratum is characterized substantially by a mesh with interruptions for at least one representation.

12. The fabric structure of claim 8 wherein said stratum is characterized by a plurality of discrete portions.

13. The fabric structure of claim 8 wherein said stratum is characterized by a plurality of discrete portions in a repeating configuration with interruptions for at least one representation.

14. The fabric structure of claim 8 wherein said membrane is microporous.

15. The fabric structure of claim 8 wherein said membrane includes an expanded polytetrafluoroethylene having micropores.

16. The fabric structure of claim 8 wherein said membrane is selected from the class consisting of a hydrophilic polyester ether and a hydrophilic urethane.

17. The fabric structure of claim 8 wherein said lining inner fabric is hydrophobic and is selected from the class consisting of nylon and polyester.

18. A fabric structure comprising:
   (a) a shell and a lining secured in close proximity to each other and spaced from each other over a majority of the areas of said shell and said lining;
   (b) said shell including an outer woven synthetic fabric, a stratum printed on the inner face thereof, and release agent impregnation thereof;
   (c) said lining including an outer synthetic polymer fabric, an intermediate synthetic polymer water-vapor-permeable membrane, and an inner synthetic polymer fabric;
   (d) said stratum having a pattern characterized by 10 to 90% coverage of the area of said outer shell fabric; and
   (e) said stratum being composed of a high tensile strength material that is adhesively bonded to said shell outer fabric, adhesively free of said lining, and adapted to prevent said shell outer fabric from unraveling and to maintain the shape of said shell.

19. The fabric structure of claim 18 wherein said pattern is composed of a urethane polymer.

20. The fabric structure of claim 18 wherein said pattern is characterized substantially by a mesh.

21. The fabric structure of claim 18 wherein said pattern is characterized substantially by a mesh with interruptions for at least one representation.

22. The fabric structure of claim 18 wherein said pattern is characterized by a plurality of discrete portions.

23. The fabric structure of claim 18 wherein said pattern is characterized by a plurality of discrete portions in a repeating configuration with interruptions for at least one representation.

24. The fabric structure of claim 18 wherein said membrane is microporous.

25. The fabric structure of claim 18 wherein said membrane includes an expanded polytetrafluoroethylene having micropores.

26. The fabric structure of claim 18 wherein said membrane is selected from the class consisting of a hydrophilic polyester ether and a hydrophilic urethane.

27. The fabric structure of claim 18 wherein said lining inner fabric is hydrophobic and is selected from the class consisting of nylon and polyester and said lining outer fabric is a knit fabric selected from the class consisting of nylon and polyester.

28. A fabric structure comprising:
   (a) a shell and a lining secured in close proximity to each other and spaced from each other over a majority of the areas of said shell and said lining;
   (b) said shell including an outer woven synthetic fabric, a stratum printed on the inner face thereof, and release agent impregnation thereof;
   (c) said stratum having a pattern characterized by 10 to 90% coverage of the area of said outer shell fabric;
   (d) said stratum being composed of a high tensile strength material that is adhesively bonded to said shell outer fabric, adhesively free of said lining, and adapted to prevent said shell outer fabric from unraveling and to maintain the shape of said shell;
   (e) said shell outer fabric being selected from the class consisting of nylon, acrylic, and polyester;
   (f) said pattern being composed of a urethane polymer;
   (g) said release agent being a fluorocarbon; and
   (h) said lining being selected from the class consisting of nylon, polyester, and a cotton blend.

29. The fabric structure of claim 28 wherein said stratum is characterized substantially by a mesh.

30. The fabric structure of claim 28 wherein said stratum is characterized substantially by a mesh with interruptions for at least one representation.

31. The fabric structure of claim 28 wherein said stratum is characterized by a plurality of discrete portions.

32. The fabric structure of claim 28 wherein said stratum is characterized by a plurality of discrete portions in a repeating configuration with interruptions for at least one representation.

33. A fabric structure comprising:
   (a) a shell and a lining secured in close proximity to each other and spaced from each other over a majority of the areas of said shell and said lining;
   (b) said shell including an outer woven synthetic fabric, a stratum printed on the inner face thereof, and release agent impregnation thereof;
   (c) said lining including an intermediate synthetic polymer water-vapor-permeable membrane and an inner synthetic polymer fabric;
   (d) said stratum having a pattern characterized by 10 to 90% coverage of the area of said outer shell fabric; and
   (e) said stratum being composed of a high tensile strength material that is adhesively bonded to said shell outer fabric, adhesively free of said lining, and adapted to prevent said shell outer fabric from unraveling and to maintain the shape of said shell;
   (f) said shell outer fabric being selected from the class consisting of nylon, acrylic, and polyester;
   (g) said pattern being composed of a urethane polymer;
   (h) said release agent being a fluorocarbon; and
   (i) said lining inner fabric being hydrophobic and selected from the class consisting of nylon and polyester.

34. The fabric structure of claim 33 wherein said stratum is characterized substantially by a mesh.

35. The fabric structure of claim 33 wherein said stratum is characterized substantially by a mesh with interruptions for at least one representation.

36. The fabric structure of claim 33 wherein said stratum is characterized by a plurality of discrete portions.

37. The fabric structure of claim 33 wherein said stratum is characterized by a plurality of discrete portions in a repeating configuration with interruptions for at least one representation.

38. The fabric structure of claim 33 wherein said membrane is microporous.

39. The fabric structure of claim 33 wherein said membrane includes an expanded polytetrafluoroethylene having micropores.

40. The fabric structure of claim 33 wherein said membrane is selected from the class consisting of a hydrophilic polyester ether and a hydrophilic urethane.

41. A fabric structure comprising:

(a) a shell and a lining secured in close proximity to each other and spaced from each other over a majority of the areas of said shell and said lining;

(b) said shell including an outer woven synthetic fabric, a stratum printed on the inner face thereof, and release agent impregnation thereof;

(c) said lining including an outer synthetic polymer fabric, an intermediate synthetic polymer water-vapor-permeable membrane, and an inner synthetic polymer fabric;

(d) said stratum having a pattern characterized by 10 to 90% coverage of the area of said outer shell fabric; and (e) said stratum being composed of a high tensile strength material that is adhesively bonded to said shell outer fabric, adhesively free of said lining, and adapted to prevent said shell outer fabric from unraveling and to maintain the shape of said shell;

(f) said shell outer fabric being selected from the class consisting of nylon, acrylic, and polyester;

(g) said pattern being composed of a urethane polymer;

(h) said release agent being a fluorocarbon;

(i) said lining inner fabric being hydrophobic and being selected from the class consisting of nylon and polyester; and (j) said lining outer fabric being a knit fabric selected from the class consisting of nylon and polyester.

42. The fabric structure of claim 41 wherein said pattern is characterized substantially by a mesh.

43. The fabric structure of claim 41 wherein said pattern is characterized substantially by a mesh with interruptions for at least one representation.

44. The fabric structure of claim 41 wherein said pattern is characterized by a plurality of discrete portions.

45. The fabric structure of claim 41 wherein said pattern is characterized by a plurality of discrete portions in a repeating configuration with interruptions for at least one representation.

46. The fabric structure of claim 41 wherein said membrane is microporous.

47. The fabric structure of claim 41 wherein said membrane includes an expanded polytetrafluoroethylene having micropores.

48. The fabric structure of claim 41 wherein said membrane is selected from the class consisting of a hydrophilic polyester ether and a hydrophilic urethane.

\* \* \* \* \*